(12) United States Patent
Hilton et al.

(10) Patent No.: US 12,000,379 B2
(45) Date of Patent: Jun. 4, 2024

(54) WIND TURBINE SYSTEM

(71) Applicant: Vestas Wind Systems A/S, Aarhus N (DK)

(72) Inventors: Dan Hilton, Gjern (DK); Johnny Nielsen, Svenstrup J (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/006,092

(22) PCT Filed: Jul. 1, 2021

(86) PCT No.: PCT/DK2021/050221
§ 371 (c)(1),
(2) Date: Jan. 19, 2023

(87) PCT Pub. No.: WO2022/017569
PCT Pub. Date: Jan. 27, 2022

(65) Prior Publication Data
US 2023/0272777 A1 Aug. 31, 2023

(30) Foreign Application Priority Data
Jul. 21, 2020 (DK) .................. PA 2020 70499

(51) Int. Cl.
*F03D 17/00* (2016.01)
*F03D 1/02* (2006.01)
*F03D 7/02* (2006.01)

(52) U.S. Cl.
CPC .............. *F03D 17/00* (2016.05); *F03D 1/02* (2013.01); *F03D 7/0204* (2013.01);
(Continued)

(58) Field of Classification Search
CPC .................. F03D 1/02; F05B 2270/328; F05B 2270/329; F05B 2270/331; F05B 2270/80; F05B 2270/802; F05B 2270/1095
See application file for complete search history.

(56) References Cited

U.S. PATENT DOCUMENTS 11,225,950 B2 * 1/2022 Baun .................. E04G 3/24
11,371,484 B2 * 6/2022 Hamilton ............ G01W 1/10
(Continued)

FOREIGN PATENT DOCUMENTS

CN      107630794 A    1/2018
EP      3591218 A1    1/2020
(Continued)

OTHER PUBLICATIONS

Danish Patent and Trademark Office, 1st Technical Examination, Search Report, and Written Opinion issued in corresponding DK Application No. PA 2020 70499, dated Feb. 19, 2021.
(Continued)

*Primary Examiner* — Courtney D Heinle
*Assistant Examiner* — Danielle M. Christensen
(74) *Attorney, Agent, or Firm* — Wood Herron & Evans LLP

(57) ABSTRACT

A wind turbine system comprising: a wind turbine; and a monitoring system, wherein the wind turbine comprises: a tower; an arm extending from the tower, a rotor-nacelle assembly (RNA) carried by the arm; and a Global Navigation Satellite System (GNSS) sensor carried by the arm or the RNA. The monitoring system is configured to receive position data from the GNSS sensor and obtain a moment or force measurement on the basis of the position data.

25 Claims, 6 Drawing Sheets

(52) U.S. Cl.
CPC ... *F05B 2270/328* (2013.01); *F05B 2270/329* (2013.01); *F05B 2270/331* (2013.01)

(56) References Cited

U.S. PATENT DOCUMENTS

| | | |
|---|---|---|
| 2010/0140936 A1 | 6/2010 | Benito et al. |
| 2018/0100488 A1 | 4/2018 | Miranda et al. |
| 2019/0203698 A1 | 7/2019 | Müller et al. |
| 2021/0270236 A1* | 9/2021 | Neto .................. F03D 1/02 |

FOREIGN PATENT DOCUMENTS

| | | |
|---|---|---|
| WO | 2017202945 A1 | 11/2017 |
| WO | 2019042515 A1 | 3/2019 |
| WO | 2020007431 A1 | 1/2020 |
| WO | 2020125896 A1 | 6/2020 |

OTHER PUBLICATIONS

International Searching Authority, International Search Report and Written Opinion issued in corresponding PCT Application No. PCT/DK2021/050221, dated Sep. 30, 2021.

* cited by examiner

WIND TURBINE SYSTEM

FIELD OF THE INVENTION

The present invention relates to a wind turbine system, and a method of monitoring a wind turbine. The invention relates particularly, but not exclusively, to a multi-rotor wind turbine.

BACKGROUND OF THE INVENTION

A key distinguishing structural difference between conventional horizontal axis wind turbines (HAWTs) and multi-rotor HAWTs is that the rotor-nacelle assembly (RNA) is displaced from the tower by a support arm. This introduces new structural loads and dynamics.

A conventional approach would be to install one or more strain sensors in the support arm, either of the electrical resistance type or a type of optical sensor (e.g. fiber Bragg grating) and directly measure the strain in the support arm which could be further converted to bending moment after calibration. The disadvantages of this approach are cost, additional control system complexity and the possibility of failure, which would cause lost production and require replacement.

Another approach would be to estimate the bending moment by measuring or estimating the forces acting on the RNA and knowing the length of the arm. The difficulty is knowing the magnitude and direction for all the forces (e.g. aerodynamic thrust, weight due to gravity, tension in support cables) and is further complicated when dynamic motion is considered (tower bending, yawing, loads from other RNAs).

SUMMARY OF THE INVENTION

A first aspect of the invention provides a wind turbine system comprising: a wind turbine; and a monitoring system, wherein the wind turbine comprises: a tower; an arm extending from the tower, a rotor-nacelle assembly (RNA) carried by the arm; and a Global Navigation Satellite System (GNSS) sensor carried by the arm or the RNA; wherein the monitoring system is configured to receive position data from the GNSS sensor and obtain a moment or force measurement on the basis of the position data.

Optionally the arm is a first arm, the RNA is a first RNA; and the wind turbine is a multi-rotor wind turbine further comprising a second arm extending from the tower; and a second rotor-nacelle assembly (RNA) carried by the second arm.

A second Global Navigation Satellite System (GNSS) sensor may be carried by the second arm or the second RNA.

Optionally the position data is first position data, the tower comprises a tower body and a yaw structure which is rotatably mounted to the tower body, the first arm extends from the yaw structure, the second arm extends from the yaw structure, and the monitoring system is configured to receive second position data from the second GNSS sensor and obtain a yaw moment measurement on the basis of the first position data and the second position data, wherein the yaw moment measurement indicates a net yaw moment applied to the yaw structure by the first and second arms.

A yaw control system may be configured to apply a yaw control torque to the yaw structure.

A control system may be configured to control an operating parameter of the wind turbine on the basis of the moment or force measurement.

The operating parameter may be a blade pitch or generator torque.

A further aspect of the invention provides a method of monitoring a wind turbine, the wind turbine comprising a tower; an arm extending from the tower; a rotor-nacelle assembly (RNA) carried by the arm; and a Global Navigation Satellite System (GNSS) sensor carried by the arm or the RNA, the method comprising: generating position data with the GNSS sensor; and obtaining a moment or force measurement on the basis of the position data.

The moment or force measurement may be obtained on the basis of the position data and on the basis of a stiffness parameter which is indicative of a stiffness of the arm.

Optionally the position data comprises first position data; the wind turbine further comprises a reference Global Navigation Satellite System (GNSS) sensor; the method further comprises generating reference position data with the reference GNSS sensor; and the moment or force measurement is obtained on the basis of the first position data and on the basis of the reference position data.

The reference GNSS sensor may be carried by the tower or a root of the arm.

Optionally the arm extends from a root away from the tower, and the method further comprises determining a position of a root of the arm, wherein the moment or force measurement is obtained on the basis of the position data and the position of the root of the arm.

The position of the root of the arm may be determined on the basis of the reference position data from the reference GNSS sensor.

The method may further comprise defining a reference axis of the arm, wherein the moment or force measurement is obtained on the basis of the position data and the reference axis of the arm.

Optionally the tower comprises a tower body and a yaw structure which is rotatably mounted to the tower body, the arm extends from the yaw structure, and the reference GNSS sensor is carried by the yaw structure.

The position data may comprise horizontal position data.

The position data may comprise vertical position data.

Optionally the position data comprises horizontal position data; the moment or force measurement comprises a horizontal moment or force measurement; and the method further comprises generating vertical position data with the GNSS sensor; and obtaining a vertical moment or force measurement on the basis of the vertical position data.

Optionally the method further comprises controlling an operating parameter of the wind turbine on the basis of the moment or force measurement.

The moment or force measurement may be a root bending moment measurement obtained on the basis of the position data and a length of the arm.

Optionally the arm is a first arm and the RNA is a first RNA; and the wind turbine is a multi-rotor wind turbine further comprising a second arm extending from the tower; and a second rotor-nacelle assembly (RNA) carried by the second arm.

A second Global Navigation Satellite System (GNSS) sensor may be carried by the second arm or the second RNA.

Optionally the tower comprises a tower body and a yaw structure which is rotatably mounted to the tower body, the first arm extends from the yaw structure, the second arm extends from the yaw structure, the position data is first position data and the method further comprises generating second position data with the second GNSS sensor; and obtaining a yaw moment measurement on the basis of the first position data and the second position data, wherein the yaw moment measurement indicates a net yaw moment applied to the yaw structure by the first and second arms.

A further aspect of the invention provides a method of monitoring a multi-rotor wind turbine, the multi-rotor wind turbine comprising: a tower, the tower comprising a tower body and a yaw structure which is rotatably mounted to the tower body; a first arm extending from the yaw structure, a first rotor-nacelle assembly (RNA) carried by the first arm; a first Global Navigation Satellite System (GNSS) sensor carried by the first arm or the first RNA; a second arm extending from the yaw structure; a second rotor-nacelle assembly (RNA) carried by the second arm; and a second Global Navigation Satellite System (GNSS) sensor carried by the second arm or the second RNA, the method comprising: generating first position data with the first GNSS sensor; generating second position data with the second GNSS sensor; and obtaining a yaw moment measurement on the basis of the first position data and the second position data, wherein the yaw moment measurement indicates a net yaw moment applied to the yaw structure by the first and second arms.

The method may further comprise rotating the yaw structure to change a yaw angle of the first and second arms.

A further aspect of the invention provides a computer program product comprising software code adapted to monitor a wind turbine when executed on a data processing system, the computer program product being adapted to perform the method of any aspect of the invention.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
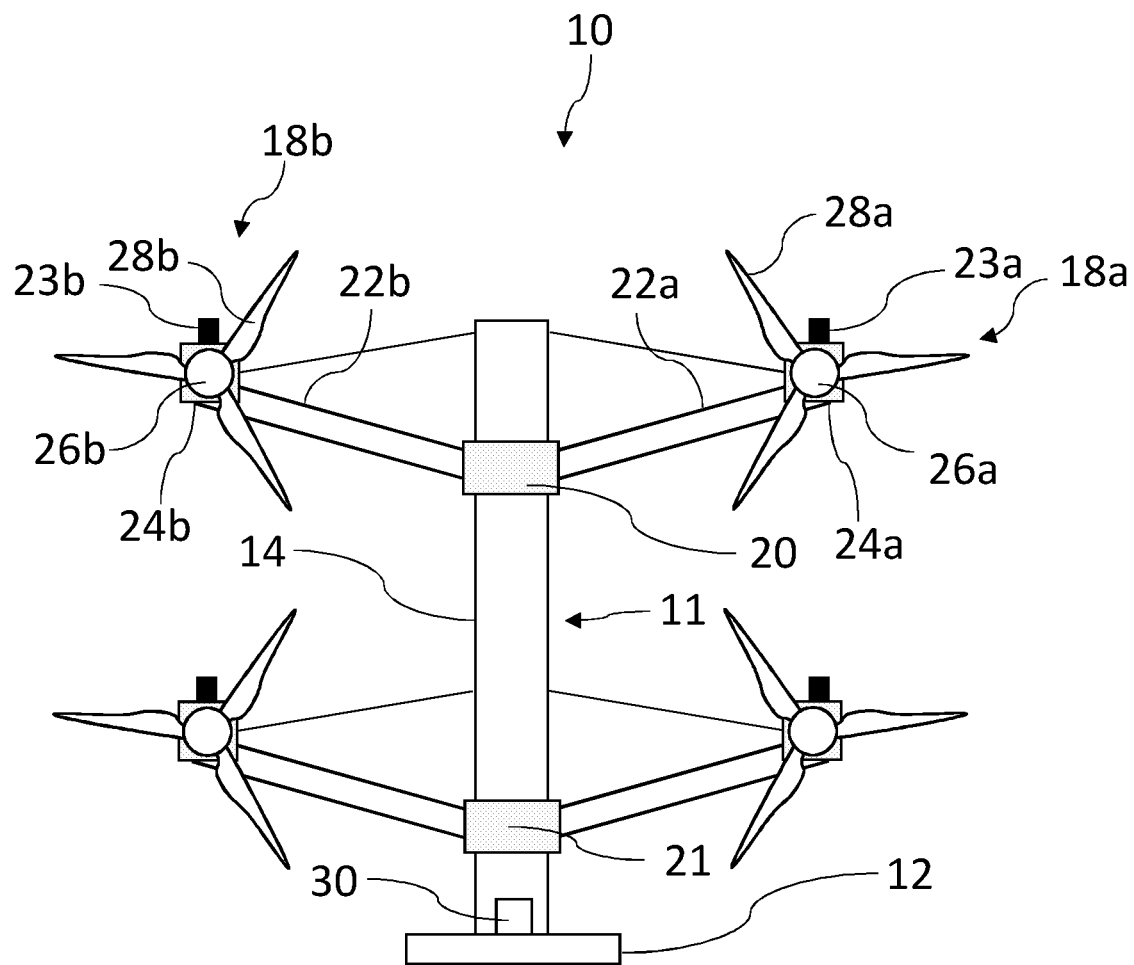
FIG. 1 shows a wind turbine system.

FIG. 1 shows a multi-rotor wind turbine system. The wind turbine system comprises a multi-rotor wind turbine 10, and a monitoring system 30. A multi-rotor wind turbine is any wind turbine with at least two rotor-nacelle-assemblies, which distinguishes the wind turbine 10 from a traditional, single-rotor wind turbine.

The multi-rotor wind turbine 10 comprises a tower 11. The tower 11 comprises a foundation 12, a vertical central body 14 and a pair of yaw structures 20, 21 rotatably mounted to the body 14.

Each yaw structure 20, 21 carries a respective pair of rotor-nacelle assemblies (RNAs). The RNAs are identical, so only the upper pair of RNAs 18a, 18b carried by the yaw structure 20 will be described in detail. Note that in this example, the multi-rotor wind turbine 10 has four RNAs, but in alternative embodiments of the invention the multi-rotor wind turbine may have only two RNAs, or more than four RNAs.

A first arm 22a extends from the tower 11, and the first RNA 18a is carried by the first arm. A second arm 22b extends from the tower 11, and the second RNA 18b is carried by the second arm 22b. Each arm 22a, 22b extends from a respective root or proximal end where it is attached to the yaw structure 20, to a tip or distal end where it carries the RNA.

While the first and second arms 22a, 22b are shown as extending diagonally upwardly from the tower 11, in other embodiments the first and second arms 22a, 22b may extend substantially horizontally from the tower 11, or diagonally downwardly from the tower 11. In a general sense, the arms extend laterally from the tower.

The first and second arms 22a, 22b are coupled to the body 14 by the yaw structure 20, which may be a collar which is rotatably mounted to the body 14 so that the collar can rotate about a vertical yaw axis. This enables the RNAs 18a, 18b to rotate into the incident wind and the wind turbine may thereby achieve improved energy production.

Each RNA 18a, 18b comprises a nacelle 24a, 24b at the end of a respective arm 22a, 22b; and a rotor comprising a hub 26a, 26b and a set of blades 28a, 28b. Each rotor is arranged to rotate in order to drive a generator inside the nacelle and thereby to generate electricity. The blades 28a, 28b are arranged to create lift due to incident wind and may thereby cause the rotors to rotate. While rotors with three blades are shown, it will be understood that rotors having more or fewer blades may be used.

Each RNA carries a respective Global Navigation Satellite System (GNSS) sensor 23a, 23b. A first GNSS sensor 23a is mounted on the nacelle 24a of the first RNA; and a second GNSS sensor 23b is mounted on the nacelle 24b of the second RNA.

In this example each GNSS sensor 23a, 23b is mounted on the top of the nacelle of the RNA (for example on the cooler top) but in alternative embodiments each GNSS sensor may be mounted on another part of the RNA.

In this example each GNSS sensor 23a, 23b is carried by a respective RNA, but in alternative embodiments each sensor may be carried at the distal end of a respective one of the arms 22a, 22b.

Each GNSS sensor 23a, 23b is a position sensor that uses one or more Global Navigation Satellite Systems (such as GPS, Galileo, GLONASS, BeiDou) to determine its position. The GNSS sensor can measure its position with cm accuracy to generate position data. The position data may be generated by the GNSS sensor as a set of coordinates, for example (longitude, latitude, height), (x, y, z) or (r, θ, φ).

Each GNSS sensor uses a constellation of satellites to determine its position. Optionally each GNSS sensor may enhance the precision of its position measurement using a terrestrial Real Time Kinematic (RTK) base module. This RTK module may be shared between a number of wind turbines in a wind park.

The monitoring system 30 is configured to receive position data from the GNSS sensors 23a, 23b and obtain a moment or force measurement on the basis of the position data. In this example the monitoring system 30 is integrated into the wind turbine 10 at a base of the tower 11, but in other embodiments it may be located in other parts of the wind turbine 10, or at a site remote from the wind turbine 10.

Figure 2:
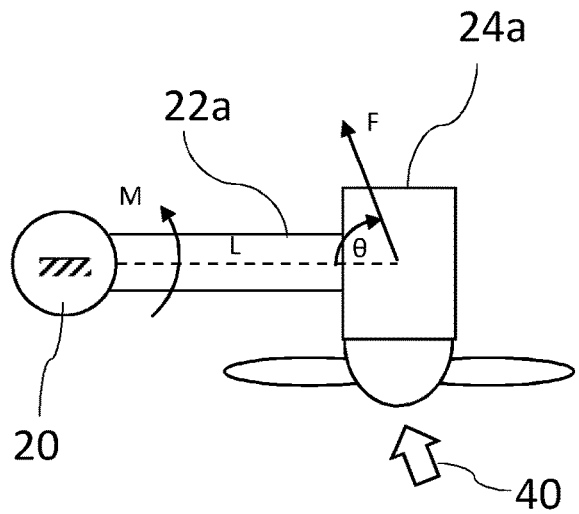
FIG. 2 is a plan view of an RNA with a yaw error.
Figure 3:
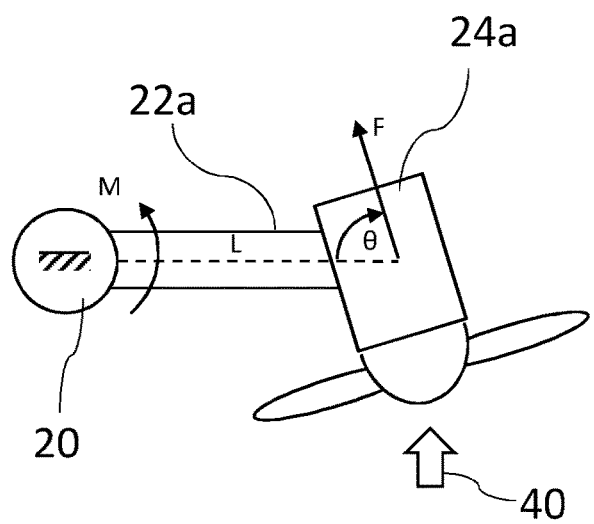
FIG. 3 is a plan view of a toed-out RNA.

In the simplest case, each nacelle is fixed relative to the arm and the applied thrust force on the RNA is perpendicular to the arm. A more realistic case is where the thrust force is not perpendicular to the arm. A first example due to yaw error is shown in FIG. 2—the RNA is not pointing directly into the wind 40 so the thrust force F is at an oblique angle θ to the arm. A second example is shown in FIG. 3. In this case the RNA has a degree of freedom that allows the RNA to rotate relative to the arm 22a (toe-in or toe-out). FIG. 3 shows the RNA in a toe-out configuration relative to the wind 40.

In this case, the root bending moment, M, can be calculated knowing the net force, F, the arm length, L, and the angle, θ, between the arm and the net force, by the following rigid body equation 1:

$$M = \sin\theta FL \qquad \text{Equation 1}$$

Figure 4:
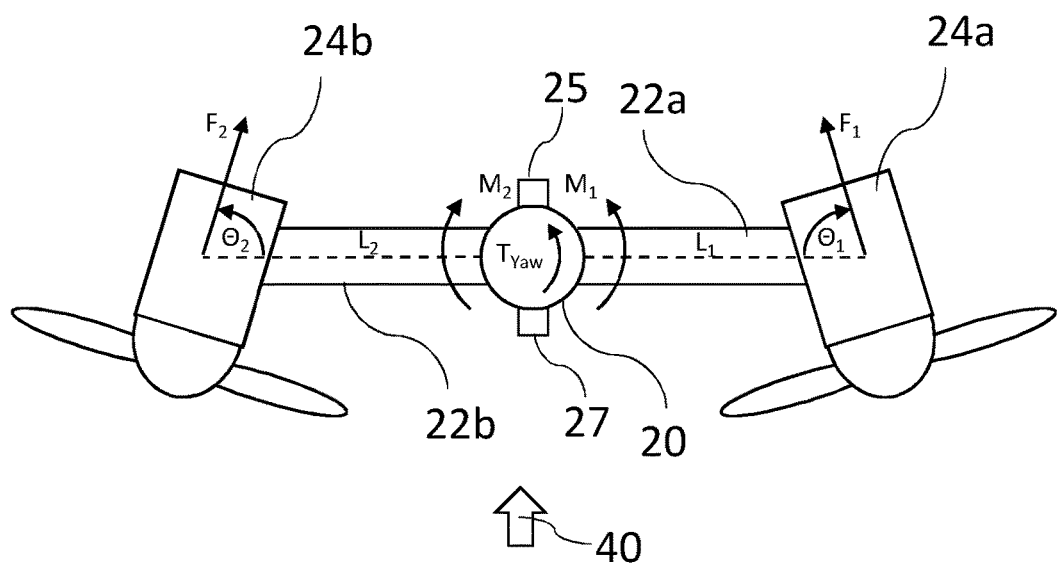
FIG. 4 shows the yaw moments acting on the yaw structure.

As shown in FIG. 4, the RNAs are mounted on opposing arms 22a, 22b that are attached to a common yaw structure 20 so that the net torque applied to the yaw structure 20 by the two RNAs is minimized.

The yaw structure 20 is coupled to a yaw control system which is configured to apply a yaw control torque to the yaw structure 20. For example the yaw control system may comprise a brake 25 and/or a motor 27. The brake 25 can apply a brake torque to the yaw structure 20 to prevent it from rotating, and/or the motor 27 can apply a motor torque to the yaw structure 20 to rotate the RNAs into or out of the wind.

For this two arm/two RNA configuration, the following rigid body relationship applies:

$$\Sigma T = T_{Yaw} + M_1 - M_2 = I\alpha = T_{Yaw} + \sin\theta_1 F_1 L_1 - \sin\theta_2 F_2 L_2 \qquad \text{Equation 2}$$

where ΣT is the total net torque applied to the yaw structure 20, $T_{Yaw}$ is the yaw control torque from the yaw control system (i.e. from the brake 25 or motor 27), I is the moment of inertia for the entire structure, α is the angular acceleration of the structure (i.e. yaw acceleration), $M_1$ is the moment applied by the first RNA, $M_2$ is the moment applied by the second RNA, $F_1$ is the net force from the first RNA, $F_2$ is the net force from the second RNA, $\theta_1$ is the angle between the first arm 22a and the net force $F_1$, and $\theta_2$ is the angle between the second arm 22b and the net force $F_2$.

A problem with this approach is, firstly, it assumes rigid bodies (rigid tower, rigid arms, etc). Secondly, to estimate the root bending moment in one arm 22a, 22b, the variables associated with the other arm and the yaw system 20, 25, 27 need to be known or estimated at the same time. The situation is further complicated in a real application because the central body 14 of the tower is elastic (i.e. the entire structure can move dynamically) which applies a bending moment to the arms 22a, 22b and the forces acting on the rotor are highly dynamic and difficult to accurately estimate in all operating conditions.

Figure 5:
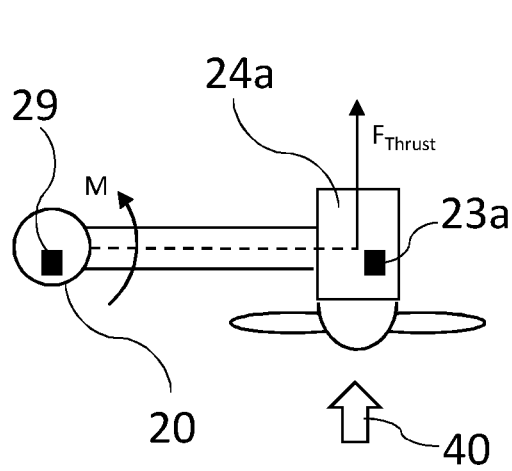
FIG. 5 shows a reference sensor and the horizontal thrust force acting on the RNA.
Figure 6:
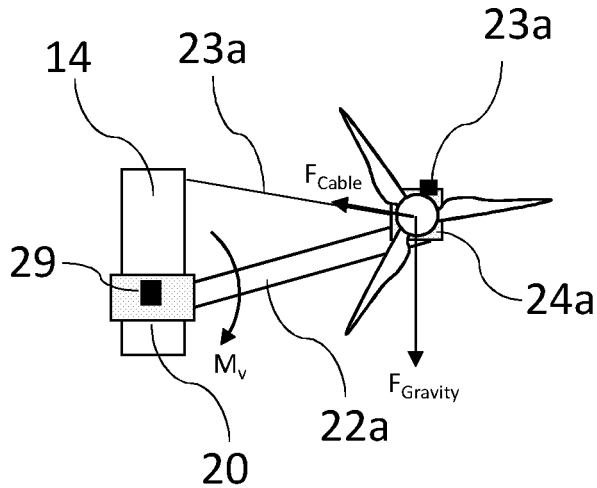
FIG. 6 shows the reference sensor and the gravity and cable forces acting on the RNA.

An alternative approach is thus, instead of using classical mechanics as used above, elastic beam theory can be used to transform displacement of the RNA to root bending moment in the arm. This can be applied to both axes (up-down and fore-aft) as shown in FIGS. 5 and 6, since a GNSS sensor may be configured to provide the location in three-dimensions (for example latitude, longitude and elevation).

Figure 7:
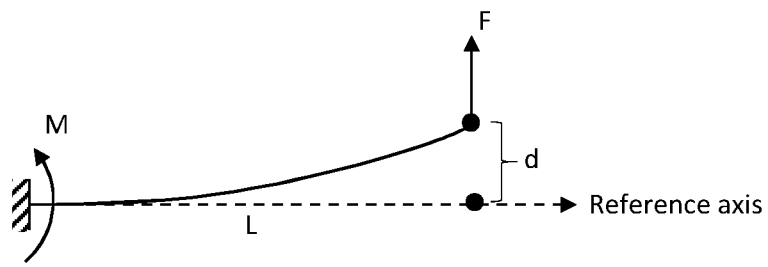
FIG. 7 shows the arm displaced by a distance from a reference axis.

A single arm and RNA structure can be considered as a cantilever beam as shown in FIG. 7. For a cantilever beam subject to a force, F, applied at the end of an arm with length, L, the displacement, d shown in FIG. 7 can be found by:

$$d = \frac{FL^3}{3EI} \qquad \text{Equation 3}$$

where E, is the Young's modulus of the arm, and I is the area moment of inertia. EI can also be referred to as the bending stiffness, K. The root bending moment, M, can be calculated by:

$$M = FL \qquad \text{Equation 4}$$

With substitution, there are two equations related to the displacement d of the RNA:

$$d = \frac{FL^3}{K} \qquad \text{Equation 5}$$

$$d = \frac{ML^2}{K} \qquad \text{Equation 6}$$

The stiffness parameter, K, is thus related to the net force and displacement by the following:

$$K = \frac{FL^3}{d} \qquad \text{Equation 7}$$

K can be found by various methods. It could be a provided value, say from finite element analysis (FEA) or a configuration parameter shared across multiple turbines determined previously. Or it could be found by means of calibration. In the simplest case, a single known force and displacement measurement could be used, though the more robust solution would be to collect a series of force and displacement data and then use a method, such as least squares, to find the best estimate of K. This can be achieved by a calibration procedure, which is performed once or repeatedly over time, under certain conditions that give the most accurate force and displacement measurements (i.e. low turbulence, no yawing, etc). It can also be achieved under normal operation, in which case a lot of measurement data is collected, and a machine learning algorithm finds the best estimate of K.

Once the stiffness parameter, K, is known, the root bending moment, M, can be calculated continuously in operation by the monitoring system 30 which may be configured to apply the following equation using the measured displacement d as the input signal:

$$M = \frac{Kd}{L^2} \qquad \text{Equation 8}$$

A challenge with this approach is, the displacement d of the RNA due to bending loads is relative to an initial position. As soon as the turbine yaws or the tower body 14 begins to sway or the RNA rotates relative to the arm, the position reported by the GNSS sensor will also change and it will not be possible to distinguish between bending motion and physical movement without additional information. Thus the initial/neutral position of the RNA (i.e. when the arm is not subject to bending) needs to be known. This can be accomplished by various methods.

Figure 8:
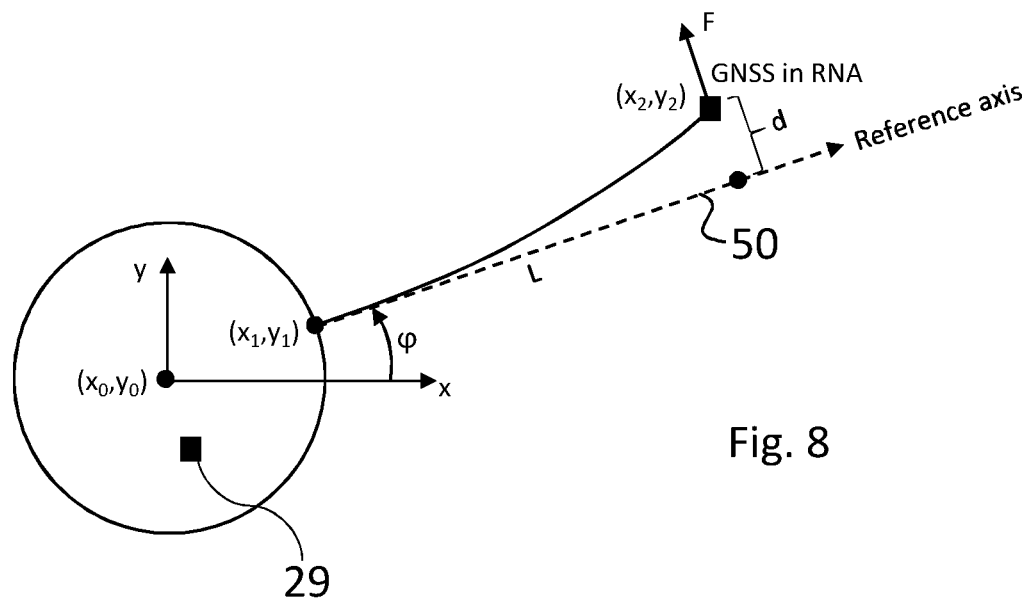
FIG. 8 shows a method of using a reference axis and arm root position to determine a displacement of the RNA.

One method is to define a reference axis 50 shown in FIG. 8 (the axis pointing along the arm towards the RNA passing through the neutral position) by the position of the root of the arm, point ($x_1$, $y_1$), and the yaw angle φ of the reference axis 50, either in global coordinates (i.e. true north heading) or in local coordinates (i.e. yaw angle relative to a known fixed position). Given this angle, φ, the position of the root of the arm, point ($x_1$, $y_1$), and the position of the RNA from the GNSS sensor, the displacement, d, between the reference axis 50 and the RNA can be determined by calculation.

If the reference axis 50 is aligned with the axis of rotation of the yaw structure 20, then the position of the root of the arm, point ($x_1$, $y_1$), can be found by using the yaw angle, φ, and knowing the distance from the axis of rotation of the yaw structure 20 to the root of the arm. The axis of rotation of the yaw structure 20 can be estimated by, for example, recording the position of the RNA while yawing, which traces a circular path, and then using an algorithm to find the center of rotation.

The above assumes, however, that the tower is stationary during normal operation. In other words, the root of the arm, point ($x_1$, $y_1$), rotates about a stationary center with no translation (i.e. no tower sway). To improve the accuracy and cope with movement of the tower during operation, the precise position of the root of the arm can be used. This can come from an optional reference GNSS sensor 29 located in the yaw structure 20, at the root of the arm 22a, or at the top of the tower body which would capture any movement of the tower. Thus the position of the root of the arm 22a may be determined on the basis of reference position data from the reference GNSS sensor 29. Alternatively, an estimate of the precise position of the root of the arm may be provided by a control system of the wind turbine.

Most likely, the reference GNSS sensor 29 will not be positioned exactly at the root of the arm, nor will the GNSS sensor 23a in the RNA be aligned with the reference axis 50. A coordinate translation will be needed in this case and the distances could come from computer-aided design (CAD) or be found by means of calibration in operation (i.e. as the turbine yaws, the GNSS sensors 29, 23a will trace a circular path and the centers could be estimated).

The monitoring system 30 comprises a data processing system and a computer program product comprising software code adapted to monitor the wind turbine when executed on the data processing system. The computer program product is adapted to perform the methods described herein.

Figure 9:
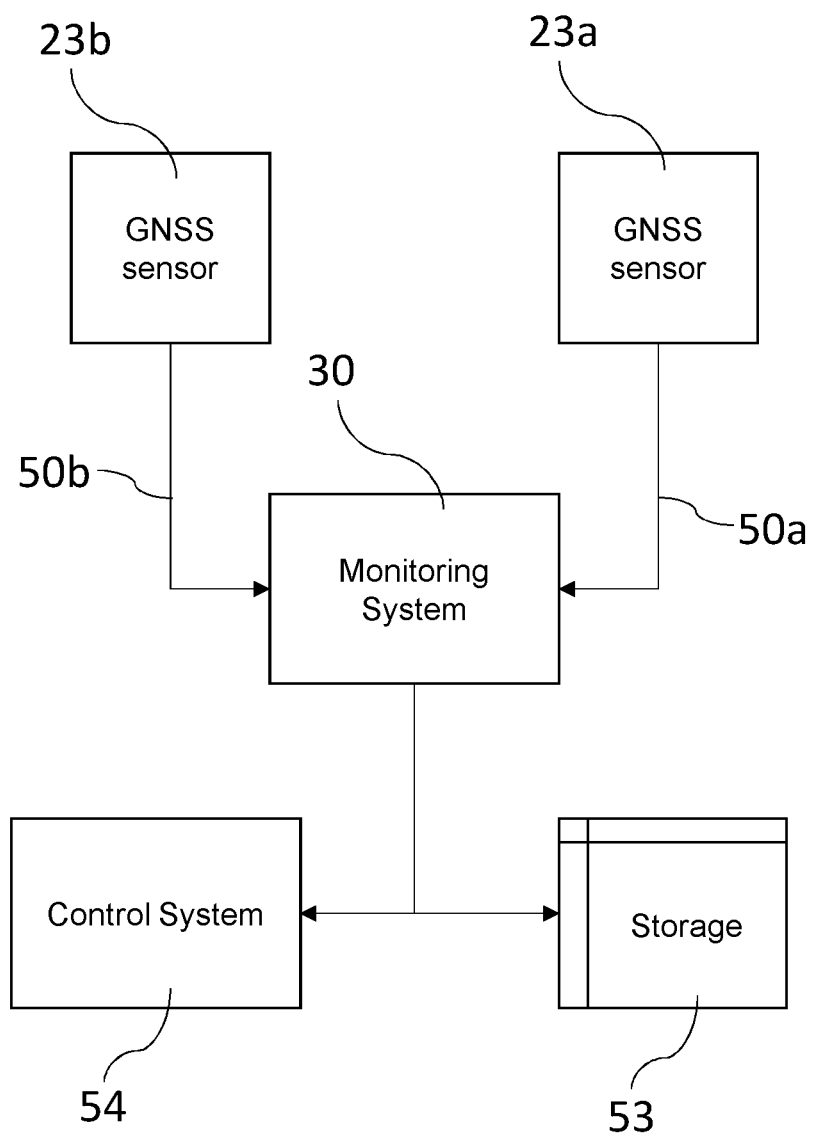
FIG. 9 is a schematic diagram showing the control and monitoring systems of the wind turbine system.

FIG. 9 shows one example. The monitoring system 30 is configured to receive first position data from the first GNSS sensor 23a on a first sensor line 50a and obtain a first root bending moment measurement $M_1$ on the basis of the first position data, using equation 8 and the reference axis method shown in FIG. 8. The monitoring system 30 is also configured to receive second position data from the second GNSS sensor 23b on a second sensor line 50b and obtain a second root bending moment measurement $M_2$ on the basis of the second position data, using equation 8 and the reference axis method shown in FIG. 8.

The monitoring system 30 may optionally also be configured to use the root bending moment measurements $M_1$ and $M_2$ to calculate a net yaw moment ($M_1-M_2$) applied to the yaw structure 20 by the RNAs, and/or to calculate the net torque $\Sigma T$ at the yaw structure 20 by equation 2.

As described above, the monitoring system 30 may be configured to receive horizontal position data (for instance latitude, longitude) from the GNSS sensors. In this case the monitoring system 30 may be configured to obtain horizontal root bending moment measurements M (i.e. moments about a vertical axis) and/or horizontal force measurements $F_{thrust}$ as shown in FIG. 5.

As shown in FIG. 6, the monitoring system 30 may be configured to receive vertical position data (for instance height) from the GNSS sensors. In this case the monitoring system may be configured to obtain vertical moment measurements indicative of a vertical root bending moment $M_v$ and/or vertical force measurements indicating forces $F_{Gravity}$ and $F_{Cable}$ acting on the RNA.

In the examples given above, the monitoring system 30 is configured to obtain root bending moment measurements on the basis of position data from the GNSS sensor, using equation 8 and the reference axis method shown in FIG. 8. In other embodiments, the monitoring system 30 may be configured to obtain force measurements indicative of the forces ($F_{Thrust}$, $F_{Gravity}$ and $F_{Cable}$) acting on the RNA on the basis of the position data from the GNSS sensor.

The information from the monitoring system 30 may be used in a number of ways. The arm holding the RNA is of critical structural importance and knowing the load will allow for structural health monitoring, adjusting the turbine's operation (i.e. derating or stopping) in high load situations and providing useful data to other control features and state estimation algorithms. Knowing the root bending moment in the arm(s) also allows for estimation of the torque being applied to the yaw structure.

In one example, the monitoring system 30 may transmit the horizontal root bending moment measurements $M_1$, $M_2$ to a control system 54 which assesses whether any of the horizontal root bending moment measurements exceeds a threshold: if so, the control system 54 may control the blade pitch and/or the generator torque of the associated RNA in order to reduce the thrust force and hence reduce the horizontal root bending moment below the threshold.

The arms experience maximum bending load at the root, so the root bending moment $M_1$, $M_2$ is an indication of the maximum bending load. For this reason it is preferred that the monitoring system 30 obtains a root bending moment measurement on the basis of the position data and a length L of the arm to its root, although this is not essential and in other embodiments the monitoring system 30 may obtain a bending moment which is not a root bending moment.

In another example, the monitoring system 30 may obtain a yaw moment measurement ($M_1-M_2$) on the basis of the first position data and the second position data, where the yaw moment measurement ($M_1-M_2$) indicates a net yaw moment applied to the yaw structure by the first and second arms. The monitoring system 30 may transmit the yaw moment measurement ($M_1-M_2$) to the control system 54 which assesses whether its magnitude exceeds a threshold: if so, the control system 54 may control the blade pitch and/or the generator torque of one or both RNAs in order to reduce the magnitude of the net yaw moment below the threshold, or the control system 54 may release the brake 25 to prevent damage.

In other examples, the monitoring system 30 may transmit the horizontal and/or vertical root bending moment measurements, the yaw moment measurement ($M_1-M_2$) and/or the net torque $\Sigma T$ to a storage device 53 which stores the information for later analysis.

By using a GNSS based approach, there is no need to directly measure the bending moment using strain sensors or other type of bending deflection measurement system. This reduces the complexity of the wind turbine and avoids the costs associated with installation and servicing of such strain sensors. Another benefit is that the GNSS data could be used for various monitoring and control functions, whereas a direct measurement system would be single purpose.

In this example a control system 54 of the wind turbine is configured to control an operating parameter of the wind turbine on the basis of the moment or force measurement. The operating parameter may be a blade pitch, a generator torque or any other operating parameter. For example the operating parameter may be associated with a tower damping system of the wind turbine or the yaw control system 25, 27.

In the preferred example of FIG. 1, the invention is implemented in a multi-rotor wind turbine system, each RNA having a GNSS sensor. The multi-rotor wind turbine system may have four RNAs as in FIG. 1, or a different number of RNAs such as two, three, five or six.

Figure 10:
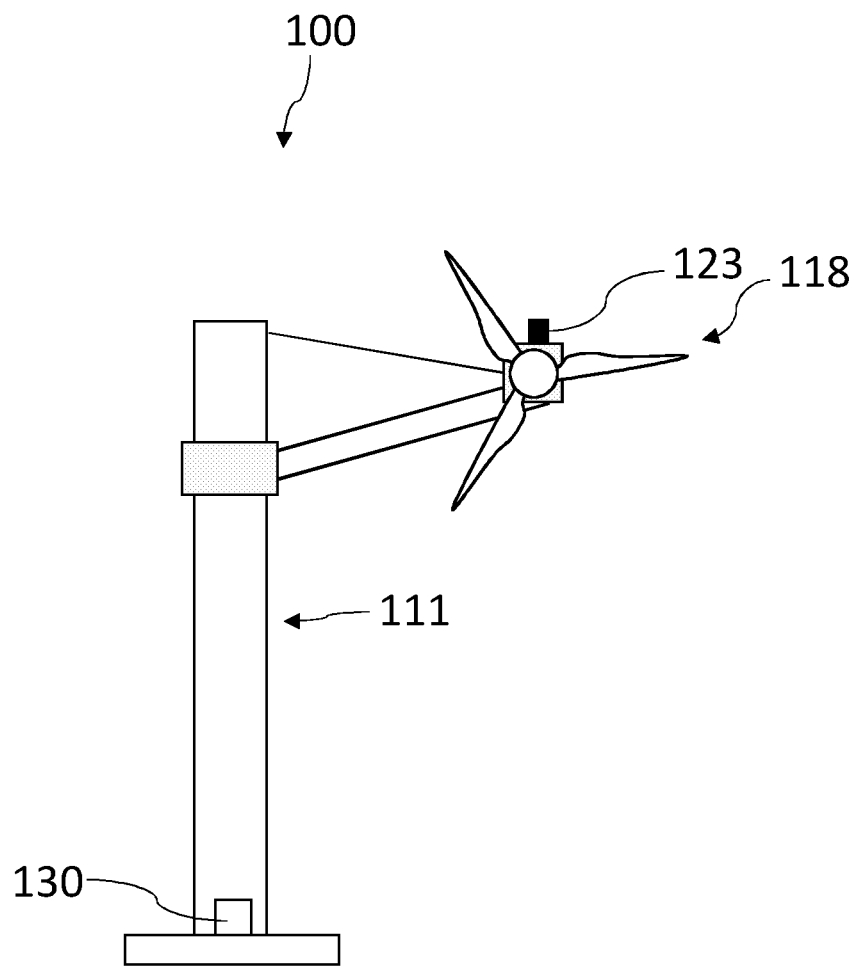
FIG. 10 shows a wind turbine system with a single RNA.

In the example of FIG. 10, the invention is implemented in a single-rotor wind turbine system 100 with only a single RNA 118 mounted on an arm extending laterally from a vertical tower 111. The single RNA 118 has a GNSS sensor 123 which is used by a monitoring system 130 to calculate a moment applied by the RNA.

Figure 11:
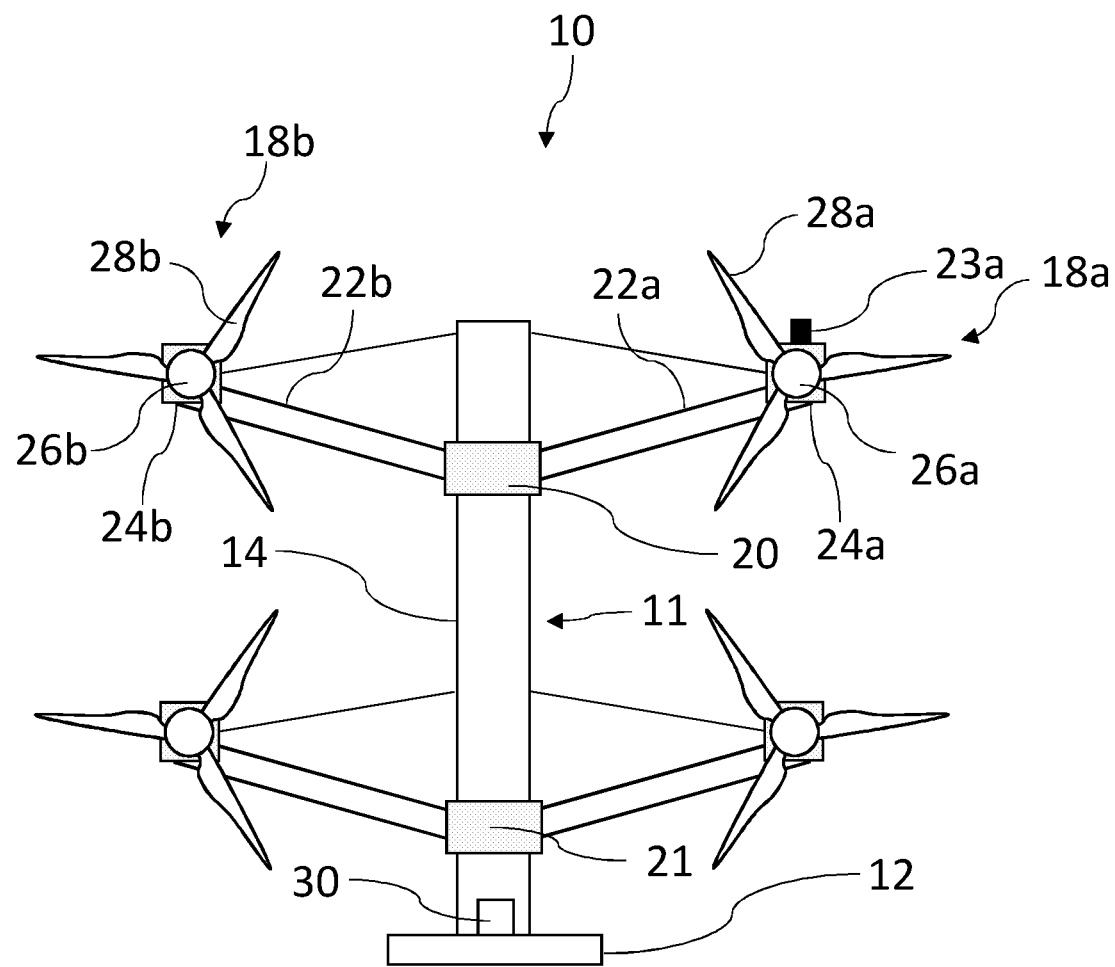
FIG. 11 shows an alternative multi-rotor wind turbine system with only a single GNSS sensor.

In the example of FIG. 11, the invention is implemented in the multi-rotor wind turbine system of FIG. 1, but in this case only the first RNA 18a has a GNSS sensor 23a.

Although the invention has been described above with reference to one or more preferred embodiments, it will be appreciated that various changes or modifications may be made without departing from the scope of the invention as defined in the appended claims.

The invention claimed is:

1. A wind turbine system comprising:
   a wind turbine including:
   a tower,
   an arm extending from the tower,
   a rotor-nacelle assembly (RNA) carried by the arm, and
   a Global Navigation Satellite System (GNSS) sensor carried by the arm or the RNA; and
   a monitoring system configured to;
   receive position data from the GNSS sensor, and
   determine a moment or force measurement on the basis of the position data.

2. The wind turbine system according to claim 1, wherein the arm is a first arm, the RNA is a first RNA; and wherein the wind turbine is a multi-rotor wind turbine further comprising a second arm extending from the tower; and a second rotor-nacelle assembly (RNA) carried by the second arm.

3. The wind turbine system according to claim 2, further comprising a second Global Navigation Satellite System (GNSS) sensor carried by the second arm or the second RNA.

4. The wind turbine system according to claim 3, wherein the position data is first position data, the tower comprises a tower body and a yaw structure which is rotatably mounted to the tower body, the first arm extends from the yaw structure, the second arm extends from the yaw structure, and the monitoring system is configured to receive second position data from the second GNSS sensor and obtain a yaw moment measurement on the basis of the first position data and the second position data, wherein the yaw moment measurement indicates a net yaw moment applied to the yaw structure by the first and second arms.

5. The wind turbine system according to claim 4, further comprising a yaw control system which is configured to apply a yaw control torque to the yaw structure.

6. The wind turbine system according to claim 1, further comprising a control system configured to control an operating parameter of the wind turbine on the basis of the moment or force measurement.

7. The wind turbine system according to claim 6, wherein the operating parameter is a blade pitch or generator torque.

8. A method of monitoring a wind turbine, the wind turbine comprising a tower;
   an arm extending from the tower; a rotor-nacelle assembly (RNA) carried by the arm; and
   a Global Navigation Satellite System (GNSS) sensor carried by the arm or the RNA, the method comprising:
   generating position data with the GNSS sensor; and
   obtaining a moment or force measurement on the basis of the position data.

9. The method according to claim 8, wherein the moment or force measurement is obtained on the basis of the position data and on the basis of a stiffness parameter which is indicative of a stiffness of the arm.

10. The method according to claim 8, wherein the position data comprises first position data; the wind turbine further comprises a reference Global Navigation Satellite System (GNSS) sensor; the method further comprises generating reference position data with the reference GNSS sensor; and the moment or force measurement is obtained on the basis of the first position data and on the basis of the reference position data.

11. The method according to claim 10, wherein the reference GNSS sensor is carried by the tower or a root of the arm.

12. The method according to claim 10, wherein the position of the root of the arm is determined on the basis of the reference position data from the reference GNSS sensor.

13. The method according to claim 8, wherein the arm extends from a root away from the tower, and the method further comprises determining a position of a root of the arm, wherein the moment or force measurement is obtained on the basis of the position data and the position of the root of the arm.

14. The method according to claim 8, further comprising defining a reference axis of the arm, wherein the moment or force measurement is obtained on the basis of the position data and the reference axis of the arm.

15. The method according to claim 8, wherein the tower comprises a tower body and a yaw structure which is rotatably mounted to the tower body, the arm extends from the yaw structure, and the reference GNSS sensor is carried by the yaw structure.

16. The method according to claim 8, wherein the position data comprises horizontal position data and/or the position data comprises vertical position data.

17. The method according to claim 8, wherein the position data comprises horizontal position data; the moment or force measurement comprises a horizontal moment or force measurement; and the method further comprises generating vertical position data with the GNSS sensor; and obtaining a vertical moment or force measurement on the basis of the vertical position data.

18. The method according to claim 8, further comprising controlling an operating parameter of the wind turbine on the basis of the moment or force measurement.

19. The method according to claim 8, wherein the moment or force measurement is a root bending moment measurement obtained on the basis of the position data and a length of the arm.

20. The method according to claim 8, wherein the arm is a first arm and the RNA is a first RNA; and wherein the wind turbine is a multi-rotor wind turbine further comprising a second arm extending from the tower; and a second rotor-nacelle assembly (RNA) carried by the second arm.

21. The method according to claim 8, further comprising a second Global Navigation Satellite System (GNSS) sensor carried by the second arm or the second RNA.

22. The method according to claim 8, wherein the tower comprises a tower body and a yaw structure which is rotatably mounted to the tower body a yaw structure, the first arm extends from the yaw structure, the second arm extends from the yaw structure, the position data is first position data and the method further comprises generating second position data with the second GNSS sensor; and obtaining a yaw moment measurement on the basis of the first position data and the second position data, wherein the yaw moment measurement indicates a net yaw moment applied to the yaw structure by the first and second arms.

23. The computer program product comprising software code adapted to monitor a wind turbine when executed on a data processing system, the computer program product being adapted to perform the method of claim 8.

24. A method of monitoring a multi-rotor wind turbine, the multi-rotor wind turbine comprising: a tower, the tower comprising a tower body and a yaw structure which is rotatably mounted to the tower body; a first arm extending from the yaw structure, a first rotor-nacelle assembly (RNA) carried by the first arm; a first Global Navigation Satellite System (GNSS) sensor carried by the first arm or the first RNA; a second arm extending from the yaw structure; a second rotor-nacelle assembly (RNA) carried by the second arm; and a second Global Navigation Satellite System (GNSS) sensor carried by the second arm or the second RNA, the method comprising:
generating first position data with the first GNSS sensor;
generating second position data with the second GNSS sensor; and
obtaining a yaw moment measurement on the basis of the first position data and the second position data, wherein the yaw moment measurement indicates a net yaw moment applied to the yaw structure by the first and second arms.

25. The method according to claim 24, further comprising rotating the yaw structure to change a yaw angle of the first and second arms.

* * * * *